May 5, 1970 G. H. FERTIG 3,510,261
ALTERNATING CURRENT FLAME IONIZATION DETECTOR
Filed Dec. 1, 1967
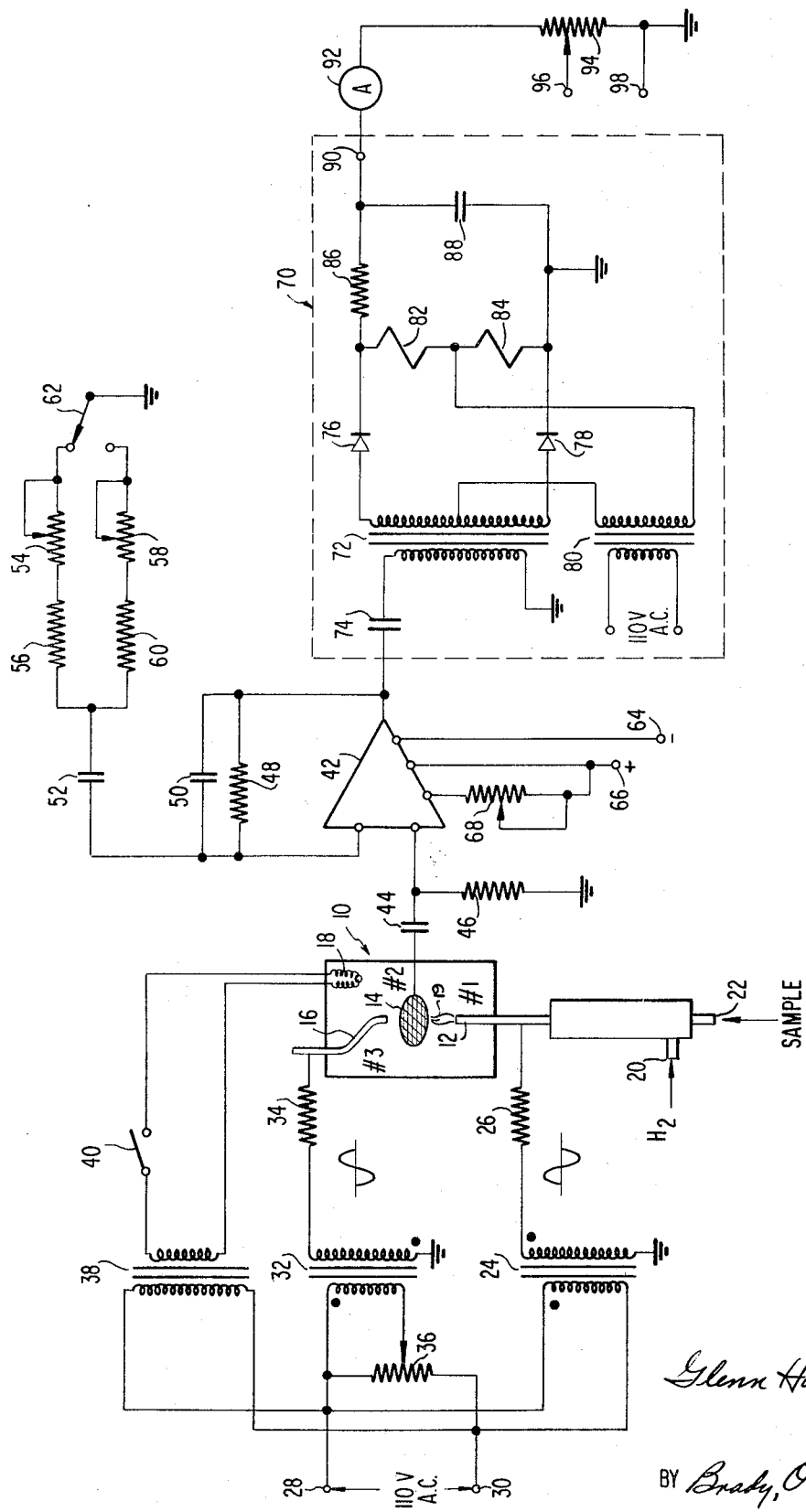
INVENTOR
Glenn Howard Fertig
BY Brady, O'Boyle & Gates
ATTORNEYS United States Patent Office 3,510,261
Patented May 5, 1970

3,510,261
ALTERNATING CURRENT FLAME IONIZATION DETECTOR
Glenn Howard Fertig, Cheswick, Pa., assignor to Mine Safety Appliances Company, Pittsburgh, Pa., a corporation of Pennsylvania
Filed Dec. 1, 1967, Ser. No. 687,217
Int. Cl. G01n 31/12
U.S. Cl. 23—254                                      11 Claims

ABSTRACT OF THE DISCLOSURE

An A.C. flame ionization detector for the examination or analysis of gases, particularly gases obtained by a chromatographic separation. The detector includes three electrodes, two of which have applied thereto A.C. signals 180° out of phase with one another. The amplitudes of the two A.C. signals are adjusted relative to one another such that a zero-output signal appears at the other electrode in absence of a sample gas in the detector; however, when a sample gas is introduced an unbalance will occur providing an A.C. output signal which can be amplified and coupled to a recorder and/or indicator.

BACKGROUND OF THE INVENTION

Gas analysis by means of a flame ionization detector is well known to those skilled in the art, particularly where a detector of this kind is used in the process known as chromatographic separation. A flame ionization detector utilizes a burning gas, usually pure hydrogen or a mixture of gases of which hydrogen is an integral part. The electrical conductivity of the flame is measured by means of two electrodes disposed in the plasma of the flame. The gas to be examined is introduced into the flame and the change in conductivity is noted.

One of the electrodes inserted in the plasma of the flame is usually formed by the burner while the other comprises a gauze or wire positioned about 10 mm. above the burner. When desirable, the electrodes may also be arranged transverse to the flame. The flame itself is usually no greater than a few millimeters in length. The conductivity of the hydrogen flame is very low, being in the order of magnitude of $10^{-12}$ to $10^{-13}$ mhos. The addition of small amounts of organic material greatly increases the conductivity of the flame. Depending upon the concentration of organic components in the flame the conductivity changes drastically which can be measured and if necessary recorded. The result of the measurement is an index of the presence or concentration of organic material in the gases supplied to the flame.

If the flame ionization detector is used as a detector behind a gas chromatography column in which hydrogen is used as the carrier gas, the gas from the column can be directly burnt in the detector; if another gas such as nitrogen is used as the carrier gas, the gas in the column is first mixed with hydrogen and then supplied to the detector. The conductivity is usually measured by connecting a direct voltage source and a resistance in series with the electrode and measuring the voltage over the measuring resistance. Since the actual value of the resistance of the flame is very high, the measuring resistance will also have to be a high value in order to obtain measurable signals. The signal over the measuring resistance may also be recorded and/or indicated and thus is usually amplified to provide sufficient signals to drive a chart recorder. An inherent difficulty immediately arises due to the fact that amplification of a D.C. signal in a D.C. amplifier results in drift to which all such amplifiers are subject.

To overcome the inherent instability of a D.C. system an A.C. circuit is desirable. One such apparatus is disclosed in U.S. Pat. 3,129,062, issued to L. Ongkiehong et al. This patent discloses the use of a third electrode which is placed in the field between the electrodes of the detector. The control electrode is coupled to a varying voltage, preferably a periodically varying voltage, that temporarily interrupts the current between the two electrodes, or at least partiallly suppresses the current. An output signal is derived from the output of the detector, preferably by means of an A.C. voltage amplifier which is recorded and/or indicated either directly or after rectification.

SUMMARY OF THE INVENTION

The present invention discloses an improved A.C. flame ionization detector system having a detecting cell which includes three electrodes, two of which are used to establish a hydrogen flame therebetween. The third electrode is located on the opposite side of the flame and is capacitively coupled to the second electrode directly opposite the burner which comprises the first electrode The second electrode then is located immediate the first and third electrodes. The present invention also includes circuit means for coupling A.C. signals 180° out of phase with respect to one another to the first and third electrode, respectively. The relative amplitudes of the A.C. signals are adjusted so that the resultant effect sensed at the second or output electrode is zero for the condition where hydrogen or a carrier gas only constitutes the flame. When the gas to be analyzed is introduced into the flame, an unbalance occurs and an A.C. signal appears at the output electrode which is then coupled to an A.C. amplifier and a synchronous rectifier. The output of the synchronous rectifier comprises a D.C. voltage which can be selectively coupled to a recorder and/or meter.

BRIEF DESCRIPTION OF THE DRAWING

The drawing is a schematic diagram of a preferred embodiment of the subject invention.

DESCRIPTION OF THE PREFERRED EMBODIMENT

Referring now to the drawing, a detector cell enclosure means 10 is shown including: a first electrode 12 comprising a metallic burner element, a second electrode 14 comprising a circular screen element located directly above the burner, and a third electrode 16 comprising a metallic probe situated above the second electrode 14 on the opposite side from the burner 12, these three electrodes being substantially in axial relationship with respect to one another. An ignitor element 18 is located inside of the detector cell 10 for initiating a flame 19 between electrodes 12 and 14.

The burner element includes two input ports 20 and 22 where hydrogen or other carrier gas and the sample to be analyzed are introduced. An electrical A.C. signal is coupled to the first electrode 12 from the secondary winding of transformer 24 by means of resistor 26. The primary winding of transformer 24 is coupled to voltage terminals 28 and 30 across which is applied a 110 volts A.C. from a source not shown. The primary and secondary windings of transformer 24, moreover, are polarized by means of a polarity dot indicating that the voltages appearing thereat have the same instantaneous phase relative to one another.

The third electrode 16 also has an A.C. signal coupled thereto by means of the secondary winding of transformer 32 and resistor 34. The primary winding of transformer 32 is coupled to a potentiomter 36 which is connected across voltage terminals 28 and 30. The end terminal of the secondary winding of transformer 32 which is connected to the third electrode 16 is oppositely poled with respect to its primary winding which means that the voltage applied to the third electrode 16 is 180° out of phase with respect to the instantaneous voltage appearing at terminal 28. The voltage appearing at the first electrode 12, however, is in phase with the instantaneous voltage appearing at voltage terminal 28. What has been achieved therefore is the application of two A.C. voltages which are 180° out of phase with one another, respectively, to the first terminal 12 and the third terminal 16.

A third transformer 38 is coupled by means of its primary winding across voltage terminals 28 and 30. The secondary winding is coupled to the ignitor 18 by means of the switch 40. The purpose of the transformer 38 is to apply a small A.C. voltage to the ignitor 18 when the switch 40 is closed to initiate the flame between the first electrode 12 comprising the burner element and the second electrode 14 comprising the wire screen when the carrier gas is fed into the input port 20.

After the carrier gas has been fed into the first electrode 12 and the flame initiated, the potentiometer 36 is manually adjusted until the A.C. voltage appearing at the second electrode 14 is zero with respect to ground indicating that the A.C. signal appearing at the first electrode 12 was cancelled by the A.C. voltage which is present at the third electrode 16. When a sample gas for example a hydrocarbon gas is fed into the burner element comprising electrode 1 through the port 22 the conductivity of the flame between electrodes 12 and 14 increases. The effect of the change in electrical conduction of the flame causes an A.C. signal to appear at the second electrode 14 the magnitude of which is a function of the change in conductivity of the flame.

The A.C. signal appearing at the second electrode 14 is coupled to a high impedance A.C. amplifier 42 by means of the coupling capacitor 44 and the input resistance 46 which is returned to ground. The A.C. amplifier 42 is shown in block diagrammatic form and comprises an operation amplifier of a conventional design which is well known to those skilled in the state of the art. Additionally, the operational amplifier includes a parallel resistance-capacitance combination comprising resistor 48 and capacitor 50 coupled from the output back to one of the inputs for providing desired feedback. Additionally, a capacitance 52 and switched resistances 54, 56, 58 and 60 are selectively connected to the capacitor 52 by means of switch 62 for further providing the desired feedback characteristic. A negative supply potential is applied to the A.C. amplifier 42 at terminal 64. A positive supply potential is applied to the A.C. amplifier 42 at terminal 66 and an additional D.C. potential is applied to the amplifier through rheostat 68 for providing balance.

The A.C. signal appearing at the second electrode 14 is amplified to a relatively high level and fed to a synchronous rectifier 70 where the signal is rectified to a D.C. voltage. The synchronous rectifier 70 comprises a transformer 72 having its primary winding capacitively coupled to the A.C. amplifier 42 by means of capacitor 74. Semiconductor rectifiers 76 and 78 are respectively coupled to the end terminals of the secondary winding of transformer 72 and the center tap thereof is connected to one end terminal of the secondary winding of transformer 80. The other end terminal of the secondary winding of transformer 80 is coupled back to the semiconductor diodes 76 and 78 by means of resistors 82 and 84, respectively. The primary winding on transformer 80 is coupled to the 110 volt A.C. potential which is applied across terminals 28 and 30.

The cathode electrode of semiconductor rectifier 76 is connected to resistor 86 while the cathode electrode of semiconductor rectifier 78 is directly connected to ground. The opposite side of resistance 86 is coupled to a filter capacitor 88 which is returned to ground. The common connection between resistor 86 and capacitor 88 is directly connected to an output terminal 90 which provides a D.C. output signal which is a function of the change in conductivity of the flame in the detector cell 10. In the present embodiment an ammeter 92 is connected in series to a potentiometer resistor 94 and this series combination is connected between the output terminal 90 and ground. When desirable, a recorder may be coupled to potentiometer 94 by means of the terminals 96 and 98.

What has been shown and described is an improved hydrogen flame ionization hydrocarbon detector having increased stability thereby overcoming the disadvantages inherent in direct coupled amplifiers.

While there has been shown and described what is at present considered to be the preferred embodiment of the subject invention, modifications thereto will readily occur to those skilled in the art. It is not desired therefore that the invention be limited to the specific arrangement shown and described, but it is to be understood that all equivalents, alterations, and modifications within the spirit and scope of the invention are herein meant to be included.

I claim as my invention:

1. A flame ionization detector for hydrocarbon gases comprising in combination:

first electrode means comprising a burner assembly adapted to receive a carrier gas such as hydrogen and a gas to be analyzed, producing a flame thereat when ignited;

second electrode means proximately located with respect to said first electrode so as to be in contact with said flame and forming an electrical conducting path therebetween;

third electrode means proximately located with respect to said second electrode means, being out of contact with said flame but being capacitively coupled to said second electrode means;

first circuit means electrically coupled to said first electrode means for applying a first A.C. signal thereto;

second circuit means electrically coupled to said third electrode means for applying a second A.C. signal thereto, said first and said second A.C. signals being oppositely phased with respect to one another; and third circuit means coupled to at least one of said first and said second circuit means for varying the relative amplitudes of said first and said second A.C. signals for establishing a substantially zero signal condition at said second electrode when said flame is ignited and burning said carrier gas only, but providing an output A.C. signal on said second electrode when said gas to be analyzed is fed to said burner assembly, said output A.C. signal being a function of the change in electrical conductivity of said flame due to the presence of said gas to be analyzed.

2. The invention as defined by claim 1 and additionally including enclosure means including means for mounting said first, second and third electrodes internally thereof.

3. The invention as defined by claim 2 wherein said enclosure means includes means for mounting said first, second and third electrodes substantially in axial relationship with respect to one another.

4. The invention as defined by claim 1 wherein said first and said second circuit means each comprises a transformer having a primary and a secondary winding and additionally including circuit means for coupling the secondary winding respectively to said first and said third electrode means.

5. The invention as defined by claim 4 wherein said third circuit means comprises a potentiometer coupled to the primary winding of at least one of said transformers.

6. The invention as defined by claim 1 and additionally including A.C. amplifier means coupled to said second electrode being responsive to said output A.C. signal for amplifying said output A.C. signal to a relatively high amplitude level.

7. The invention as defined by claim 6 and additionally including D.C. rectifier means coupled to said A.C. amplifier means for providing a D.C. output signal in response to said output A.C. signal amplified in said A.C. amplifier means.

8. The invention as defined by claim 1 wherein said first and said second circuit means comprises means for coupling A.C. signals to said first and said third electrode means which are substantially 180° out of phase with respect to one another.

9. The invention as defined by claim 1 wherein said first and said second circuit means comprises a first and a second transformer, each having a primary and a secondary winding, and additionally including circuit means for coupling said primary winding of said transformers to a source of A.C. voltage and circuit means for coupling the secondary winding in a predetermined polarity relationship respectively to said first and third electrode means for applying A.C. signals thereto which are 180° out of phase with respect to each other.

10. The invention as defined by claim 1 wherein said first and said second circuit means comprises a first and a second transformer, each having a primary and a secondary winding, and additionally including circuit means for coupling said primary winding of said transformers to a source of A.C. voltage and circuit means for coupling the secondary winding in a predetermined polarity relationship respetcively to said first and third electrode means for applying A.C. signals thereto which are 180° out of phase with respect to each other and wherein said third circuit means comprises a potentiometer connected between said primary winding of one of said transformers and said source of A.C. voltage.

11. A flame ionization detector as set forth in claim 1, in which said third electrode means is positioned on the opposite side of said second electrode means from said first electrode means.

References Cited

UNITED STATES PATENTS 3,129,062   4/1964   Ongkiehong et al.

MORRIS O. WOLK, Primary Examiner

R. M. REESE, Assistant Examiner

U.S. Cl. X.R.

23—232